US011109627B2

(12) United States Patent
Krishnan et al.

(10) Patent No.: US 11,109,627 B2
(45) Date of Patent: Sep. 7, 2021

(54) SYSTEM AND METHOD OF PATTERN-MAKING FOR MASS CUSTOMIZED PRODUCTION OF APPARELS

(71) Applicant: ESHAKTI.COM PVT LTD, Chennai (IN)

(72) Inventors: Balan Gopala Krishnan, Chennai (IN); Kishan Singh Rajawat, Haryana (IN)

(73) Assignee: ESHAKTI.COM PVT LTD, Chennai (IN)

(*) Notice: Subject to any disclaimer, the term of this patent is extended or adjusted under 35 U.S.C. 154(b) by 0 days.

(21) Appl. No.: 16/482,234

(22) PCT Filed: Jun. 1, 2018

(86) PCT No.: PCT/IN2018/050355
§ 371 (c)(1),
(2) Date: Jul. 30, 2019

(87) PCT Pub. No.: WO2018/220652
PCT Pub. Date: Dec. 6, 2018

(65) Prior Publication Data
US 2019/0343206 A1 Nov. 14, 2019

(30) Foreign Application Priority Data
Jun. 2, 2017 (IN) .............................. 201741019371

(51) Int. Cl.
*A41H 3/00* (2006.01)
*G06Q 30/06* (2012.01)
(Continued)

(52) U.S. Cl.
CPC .......... *A41H 3/007* (2013.01); *G06Q 30/0621* (2013.01); *G06Q 50/04* (2013.01); *A41D 1/00* (2013.01)

(58) Field of Classification Search
CPC ..... A41H 3/007; G06Q 30/0621; G06Q 50/04
(Continued)

(56) References Cited

U.S. PATENT DOCUMENTS

| 4,104,800 A | 8/1978 | Dyal |
| 5,930,769 A * | 7/1999 | Rose ............... G06Q 30/06 345/419 |

(Continued)

FOREIGN PATENT DOCUMENTS

| CN | 105677999 A | 6/2016 |
| EP | 0537388 A1 | 4/1993 |
| EP | 1595465 B1 | 4/2009 |

OTHER PUBLICATIONS

International Search Report dated Aug. 23, 2018 from PCT Application No. PCT/IN2018/050355.

*Primary Examiner* — Nathan E Durham
(74) *Attorney, Agent, or Firm* — Innovation Capital Law Group; Vic Lin

(57) ABSTRACT

The present invention relates to system and method of pattern-making for mass customized production of apparels. More particularly, the invention relates to height and size customizations which enable customers to get garments fitted to their body measurements. Further, the invention relates to style customization that enables customers to fashion the garment to their style preferences. The system [100] of pattern-making for mass customized production of apparels comprises a computing module [101], an internet [102], user device [106], a design database [103] comprising a product pattern repository [103a] and an order pattern repository [103b], one or more servers [104], a processor [105], a customization input module [107], a user style recommendation module [108] and a comparison module [109]. Advantageously, the present invention achieves unit manufacturing of customized individual consumer orders (Continued)

obtained from an online store, a physical store or through other channels.

9 Claims, 3 Drawing Sheets

(51) Int. Cl.
 *G06Q 50/04* (2012.01)
 *A41D 1/00* (2018.01)
(58) Field of Classification Search
 USPC .................................................. 700/130–133
 See application file for complete search history.

(56) References Cited

U.S. PATENT DOCUMENTS

| | | | | |
|---|---|---|---|---|
| 6,546,309 | B1* | 4/2003 | Gazzuolo | G06Q 30/0601 33/512 |
| 6,564,118 | B1* | 5/2003 | Swab | G06Q 30/02 700/130 |
| 6,968,075 | B1* | 11/2005 | Chang | G06K 9/00214 382/111 |
| 7,194,327 | B2* | 3/2007 | Lam | A41H 3/007 341/87 |
| 7,617,016 | B2* | 11/2009 | Wannier | A41H 3/007 700/132 |
| 7,657,340 | B2 | 2/2010 | Lind | |
| 2001/0026272 | A1* | 10/2001 | Feld | G06T 17/00 345/419 |
| 2002/0004763 | A1* | 1/2002 | Lam | G06F 1/26 705/26.44 |
| 2002/0138170 | A1* | 9/2002 | Onyshkevych | G06Q 30/06 700/130 |
| 2004/0083142 | A1* | 4/2004 | Kozzinn | G06Q 40/04 705/26.5 |
| 2005/0022708 | A1* | 2/2005 | Lee | G06Q 30/02 112/186 |
| 2006/0059054 | A1* | 3/2006 | Adiseshan | G06Q 10/04 705/26.7 |
| 2006/0287877 | A1* | 12/2006 | Wannier | G06Q 30/02 700/132 |
| 2008/0255920 | A1* | 10/2008 | Vandergrift | G06Q 30/0601 700/132 |
| 2008/0312765 | A1* | 12/2008 | Gardiner | A41H 1/00 700/132 |
| 2009/0193675 | A1 | 8/2009 | Sieber | |
| 2009/0222127 | A1* | 9/2009 | Lind | D04B 37/02 700/132 |
| 2014/0277663 | A1 | 9/2014 | Gupta et al. | |

* cited by examiner

SYSTEM AND METHOD OF PATTERN-MAKING FOR MASS CUSTOMIZED PRODUCTION OF APPARELS

FIELD OF INVENTION

The present invention relates to system and method of pattern-making for mass customized production of apparels. More particularly, the invention relates to height and size customizations which enable customers to get garments fitted to their body measurements. Further, the invention relates to style customization that enables customers to fashion the garment to their style preferences. Advantageously, the present invention achieves unit manufacturing of customized individual consumer orders obtained from an online store, physical store or through other channels.

BACKGROUND OF INVENTION

The pattern is a pre-production template that translates the size of the customer into the components that make the garment. Pattern-making is the practice of shaping a flat piece of fabric to conform to the curves of the human body per the garment design. Fit is dependent on the trueness of the pattern to the size of the body together with ease allowances. Given the variability of the human body, where no two are entirely alike, the best fit is achieved only when the pattern is made to the individual customer's size rather than conforming to a size chart which seeks to group large numbers of customers per size category. The latter leads to only an approximate fit for any individual customer, whereas the former delivers an exact fit. Further, different customers have different styling needs and preferences, including type of sleeve or neckline or length of apparel, with or without pockets, position of zip and other styling features. Obtaining from the customer through an easy user-interface her individual height, size and style needs and then catering to it by providing the customer with an opportunity to buy any product styled to her preferences and fitted exactly to her, making it a unique garment that gives her the experience of making her look her best. This approach also addresses various challenges faced by the fashion industry, such as long lead time to manufacture, risk associated with forecasting fashion trends and consequent opportunity and/or inventory loss.

CN105677999 discloses a method and device for processing garment patterns. The method comprises the steps of creating a basic pattern for a garment of a style according to basic body parameters; creating a specification table according to the pattern grading amount between the basic pattern and each standard pattern; storing pattern parameters of the basic pattern and the corresponding specification table into a pattern grading database; receiving a garment customization order input by a user, and obtaining garment style information and customer body information in the garment customization order; obtaining style marks corresponding to the garment according to the garment style information; obtaining the basic pattern of the garment of the style from the pattern grading database according to the style marks; adjusting the pattern parameters of the basic pattern according to the body information of the customer to obtain a corresponding fit pattern; and outputting the fit pattern obtained after adjustment. This invention does not cover custom styling per the customer's preferences as proposed in our invention.

U.S. Pat. No. 7,657,340B2 discloses a system usable by a processor to enable a user to select a type of garment and view an image of the pattern for the garment. Under direction of the system, the processor enables the user to input data relating to the characteristics of an intended wearer of the garment, and the processor generates a graphical model of the intended wearer. Also, under direction of the system, the processor enables the user to view a simulation of the garment worn on the graphical model. Furthermore, the system changes the pattern image in response to changes the user may make to the garment or the graphical model. This invention does not cover custom styling per the customer's preferences and also does not cover the simplified and efficient approach of reusing and modifying existing patterns as proposed in our invention.

EP0537388A1 discloses an apparatus provides a method and apparatus for producing a personalized clothing pattern at the point of sale without requiring a large stock of predetermined pattern sizes. The apparatus comprises measuring means for measuring at least the bust/chest, waist and hips of the person to whom the garment is being fitted, inputting said measurements into correlating means in which the measurements taken are compared to predetermined size values comprising inner and outer reference points for each garment pattern, noting the differences between said measured values and the inner and outer reference values and producing a personalized pattern using said variations and printing same on printing and/or plotting means at the point of sale. Preferably the correlation means includes storage means having a selection of various pattern styles which can be provided to the correlation means. The printing/plotting means may also include folding and/or cutting means to package the pattern ready for use. This invention does not cover custom styling per the customer's preferences and also does not cover the simplified and efficient approach of reusing and modifying existing patterns as proposed in our invention.

EP1595465 discloses a computer-assisted clothing design method. It includes the following steps: a) to provide, via computer, at least one garment mold made up of a basic three-dimensional surface, personified by a body enveloping cover. The above mentioned garment mold has to be defined by parametric coordinates. b) To adapt, via computer, the garment mold to the above mentioned body loosening and/or tightening different selected areas of the garment mold with respect to the body, according to the desired design. And to cut and remove, via computer, selected areas of the garment mold according to the aforementioned desired design. Additionally it includes the possibility of applying textures and color attributes to the garment mold and digitally animating the body along with the garment mold. It includes as well an additional step to design via computer patterns starting from the information as defined in the garment mold, modeled according to the desired design. This invention does not cover custom styling per the customer's preferences and also does not cover the simplified and efficient approach of reusing and modifying existing patterns as proposed in our invention.

U.S. Pat. No. 4,104,800 discloses a method for garment pattern drafting for developing proportioned or graded slopers employing a grid or graphical display based upon quarter-inch spaces and comprising a series of parallel vertical and horizontal intersecting lines, the vertical series being equispaced a number of quarter-inch spaces and sixteenth-inch fractions thereof expressed as the quotient resulting from quartering the larger of actual measurements taken around the human figure, and the horizontal series being equispaced a number of quarter-inch spaces and sixteenth-inch fractions thereof expressed as the sum of the quotient of the actual centerfront measurement taken from the same figure plus a factor of two quarter-inch spaces. Suitable mounting means for the grid as well as rule members carrying a scale for marking off distances in terms of said quarter spaces are provided for constructing the grid. Also, a scale carrying curve tracer tool capable of finding its own pivot point is provided for developing the required curvilinear lines of the pattern. However only the offline traditional method for designing a pattern is provided.

Accordingly, there exists a need for mass customization of apparels, allowing for customization of height, size and style. This need extends to both meeting a customer's fashion requirements and to reduce or eliminate inefficiencies in the current fashion industry process. Pattern-making is the key component of such a production process. This invention extends further to easy data capture and thereby delivers accurate, individual sizing as well as styling based on the customer's preferences through an optimized method of pattern-making that is required to meet the customers need.

OBJECTS OF INVENTION

It is the primary object of the present invention to provide a method of pattern-making for mass customized production of apparels.

It is another object of the present invention to provide a system of pattern-making for mass customized production of apparels.

It is another object of the present invention to provide a method that allows for mass-customization of height, size and style for each individual consumer order for individual items.

It is another object of the present invention to provide a method for mass-customization of height, size and style that enables customers to get garments fitted to their body measurements.

It is another object of the present invention to generate a unique pattern for a particular product.

It is another object of the present invention to grade the product for standard sizes.

It is another object of the present invention to provide a customized pattern making process with the built-in unique flexibility to deliver to the customer the array of the different customizations.

It is another object of the present invention to provide an order pattern repository that is searched by a software component for a pattern with the exact match of sizing and styling requirement.

It is another object of the present invention to provide a method to alter the nearest standard size to the exact height and size of the customer.

It is another object of the present invention to enable the pattern making to be faster and better with each purchase.

SUMMARY OF THE INVENTION

One or more of the problems of the conventional prior art may be overcome by various embodiments of the present invention.

It is another object of the present invention to provide a computer assisted system [100] of pattern-making for mass customized production of apparels, comprising:
  a computing module [101] to compute plurality of operations as per the user's request;
  a network [102] for communicating information between a client side [102a] and an user device [106];
  a design database [103] comprising a product pattern repository [103a] and an order pattern repository [103b];
  one or more servers [104];
  at least one processor [105];
  at least one user device [106];
  a customization input module [107];
  a user style recommendation module [108]; and
  a comparison module [109];
    wherein the computing module [101] is configured to receive user data input at its web portal or application programming interface (API),
    wherein the product pattern repository [103a] is configured to store graded patterns of standard sizes and default style and body type for all launched garments,
    wherein the order pattern repository [103b] is configured to store previously processed ordered patterns for different sizes and style specification of order, characterized in that, the customization input module [107] is configured to incorporate one or more user preferences of style and attributes, and
    wherein the product pattern and order pattern repositories [103a,103b] are searched by the comparison module [109] for finding an exact match or the closest match and then makes incremental changes with user requirements to create or manufacture a custom apparel.

It is another object of the present invention, wherein the user device [106] is selected from one or more of personal computer, personal digital assistant (PDA), smart phone, laptops, desktops or tablets.

It is another object of the present invention, wherein the user attributes are selected from one or more of size and height.

It is another object of the present invention, wherein the customization input module [108] provides options of neckline [10-15], sleeves [1-6] or length [7-9] and the like of the apparel to the user.

It is another object of the present invention, wherein the design database [103] stores all customer preference and feedback information which is automatically retrieved when pattern is made for a fresh order.

It is another object of the present invention, wherein the user style recommendation module [108] suggests the user at ordering suitable custom styling options.

It is another object of the present invention, wherein the comparison module [109] searches through the product pattern and order pattern repositories [103a,103b] for the exact or closest match to the user inputs captured from the customization input module [107].

It is another object of the present invention, wherein the size comprises standard size and custom size.

It is another object of the present invention to provide a computer assisted method [200] of pattern-making for mass customized production of apparels, comprising
  receiving [201] user attributes and style preferences at the user device [106] and computing from the customization input module [107] of the client side [102a];
  identifying [202] the user style and attributes requirements to determine standard or customized apparel order;
  searching [203] product pattern and order pattern repositories [103a,103b] for exact match or closest match by the comparison module [109];
  reusing [204] the same pattern for processing the order if an exact match is found;

modifying [205] the pattern to meet custom requirements specified, if closest match is found else updating [206] order pattern repository with last custom order input; and tailoring [207] the pattern manually for custom apparel, wherein the product pattern repository [103a] is configured to store graded patterns of all launched garments for all standard sizes and default style and body type, wherein the order pattern repository [103b] is configured to store previously processed ordered patterns and constantly updated to latest order, wherein the computing module [101] computes a closeness quotient for sizing and styling for each available pattern, and characterized in that, the customization input module [107] is configured to incorporate one or more user preferences of style and attributes, wherein the product pattern and order pattern repositories [103a,103b] are searched by the comparison module [109] for finding an exact match or the closest match with user requirements.

BRIEF DESCRIPTION OF THE DRAWINGS

So that the manner in which the features, advantages and objects of the invention, as well as others which will become apparent, may be understood in more detail, more particular description of the invention briefly summarized above may be had by reference to the embodiment thereof which is illustrated in the appended drawing, which form a part of this specification. It is to be noted, however, that the drawing illustrate only a preferred embodiment of the invention and is therefore not to be considered limiting of the invention's scope as it may admit to other equally effective embodiments.

DESCRIPTION FOR DRAWINGS WITH REFERENCE NUMERALS

Figure 1:
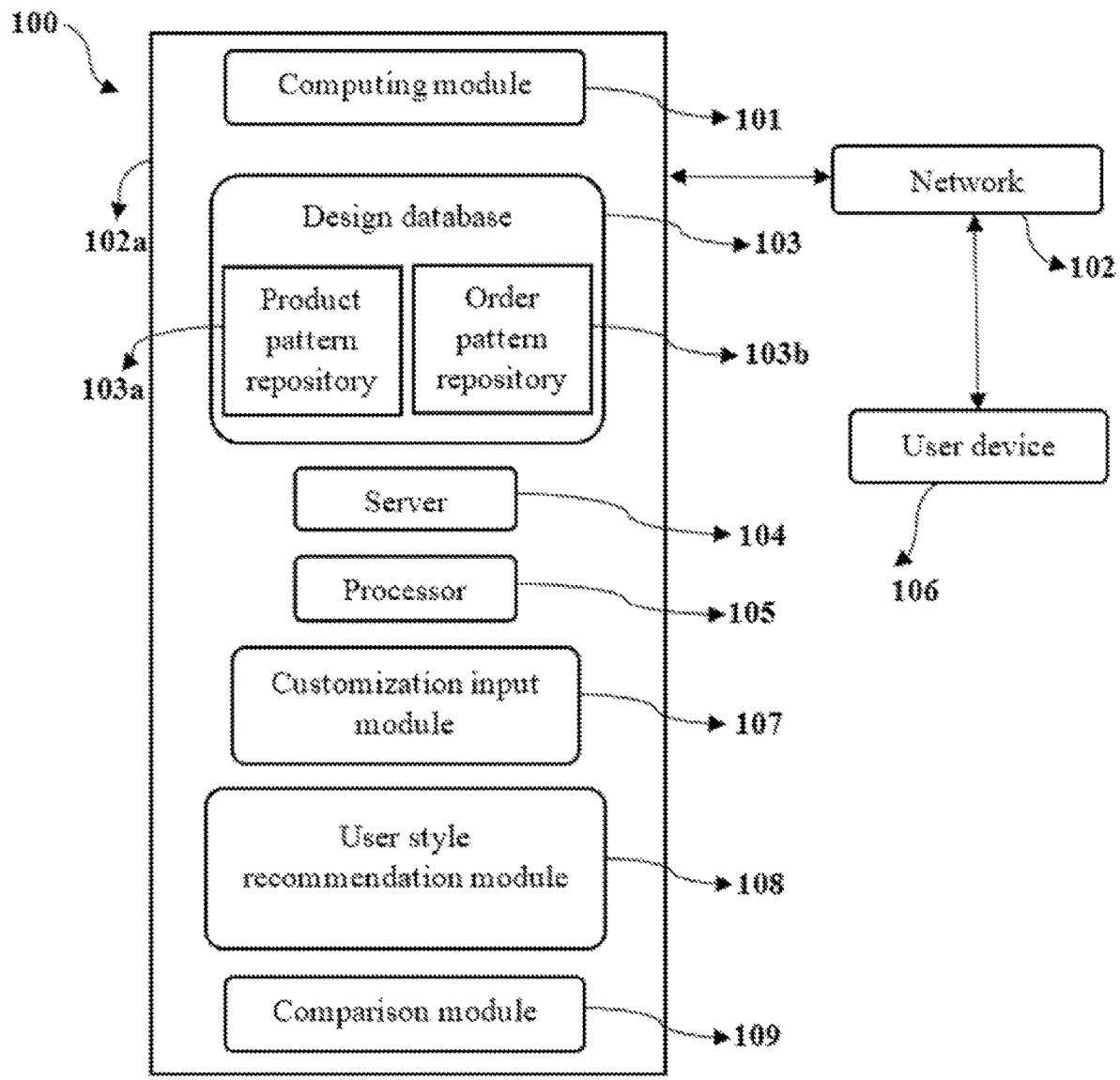
FIG. 1: illustrates the block diagram of the computer assisted system of pattern-making for mass customized production of apparels.

[100] Computer assisted system of pattern-making for mass customized production of apparels
[101] Computing module
[102] Network
[102a] Client side
[103] Design database
[103a] Product pattern repository
[103b] Order pattern repository
[104] Server
[105] Processor
[106] User device
[107] Customization input module
[108] User style recommendation module
[109] Comparison module
[10-15] Neckline
[1-6] Sleeves
[7-9] Length

[200] Computer assisted method of pattern-making for mass customized production of apparels
[201] Receiving user attributes and style preferences
[202] Identifying the user style and attributes requirements
[203] Searching product pattern and order pattern repositories for exact match or closest match by the comparison module
[204] Reusing the same pattern for processing the order if an exact match is found
[205] Modifying the pattern to meet custom requirements specified, if closest match is found
[206] Updating order pattern repository with last custom order input
[207] Tailoring the pattern manually for custom apparel

DETAILED DESCRIPTION OF THE INVENTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

According to a preferred embodiment of present invention, it defines a unique process that starts with creation of repositories of body blocks, then generating a unique pattern for a particular product (stock keeping unit or SKU), grading it for standard sizes and then creating a set of methods that start with the acquiring of customer specific height, size and style-preference information and allowing the pattern to be specific to an individual consumer's exact height, size and style preferences.

The computer assisted system [100] of pattern-making for mass customized production of apparels comprises a computing module [101] to compute plurality of operations as per the user's request, an network [102] for communicating information between a client side [102a] and an user device [106], a design database [103] comprising a product pattern repository [103a] and an order pattern repository [103b], one or more servers [104], at least one processor [105], at least one user device [106], a customization input module [107], a user style recommendation module [108] and a comparison module [109]. The client side [102a] is the online store or physical store or any channel that sells the apparel that is accessed by the user at the user device [106] and connected by a network [102].

FIG. 1 illustrates a block diagram of the computer assisted system [100] of pattern-making for mass customized production of apparels according to one embodiment. A computer assisted system [100] searches for and identifies clothing or apparel based on customer specific height, size and style-preference information and allows the pattern to be specific to an individual consumer's exact height, size and style preferences. The computer assisted system [100] of pattern-making is connected to a user device [106] and a client side [102a] through a network [102].

The user device [106] is a computing device operated by a user and is any suitable system for communicating with the computer assisted system [100]. The user device [106] may be a personal computer, personal digital assistant (PDA), smart phone, laptops, desktops or tablets or other computing system. The user device [106] provides a display to the user and receives input from the user for transmission to the client side [102a] via network [102].

The computer assisted system [100] maintains a design database [103] and other systems for selling and manufacturing custom tailored clothing or apparel online. The apparel of a specific pattern is displayed as a product image that is visualized by the user by accessing the system on the user device [106]. The additional data may include keywords associated with the clothing or apparel and may further include a style, type of clothing or apparel, description of the clothing or apparel, and design information. The user may access the computer assisted system [100] to purchase clothing or apparel of interest to the user.

The computer assisted system [100] includes various modules and databases [103] for receiving and processing information from the user device [106] and client side [102a] to provide clothing or apparel suggestions to the user of the user device [106]. The user device [106] displays various apparels exhibiting different respective styles available for purchase. Each pattern or design has different design or style components which when conceived and tailored together on a fabric, form the complete apparel. All aspects of the pattern and outfit are described, for e.g. fabric material, color, style type and so on. The aspects displayed in the product image are for visualization of the pattern of the outfit for the user, to make a choice. It is for the user assessment of the given pattern to choose the preferred pattern.

The displayed style components in the product image— for example the neckline, length of the dress and sleeve type as are there as a standard in order to assist the user in making a choice of relevance and purely for reference, and are not limited. In a preferred embodiment of the present invention the computer assisted system [100] comprises of user style recommendation module [108], customization input module [109] and comparison module [109]. The modules and other parts of computer assisted system [100] illustrated in FIG. 1 may be accompanied by additional or fewer modules in various embodiments and is not limited to the example of FIG. 3. The computing module [101] is configured to receive user data input at its web portal or application programming interfaces (API) or from the online store/play store and physical store or through other channels. The design database [103] maintains a database of clothing or apparel displayed through the computer assisted system [100] and accessible by the user at the user device [106]. The design database [103] stores all customer preference and feedback information which is automatically retrieved when pattern is made for a fresh order.

The user recommendation module [108] receives a search request from the user device [106] and suggests and performs a search for similar or matching clothes on design database [103]. The user style recommendation module [108] suggests the user at ordering suitable custom styling options.

The customization input module [107] provides options of neckline [10-15], sleeves [1-6] or length [7-9] and the like of the apparel to the user. The neckline is selected from the boat [14], scoop [13], U-neck [12], V-neck [11], wide-scoop [10], wide V [15] and the like. The sleeves are selected from the bracelet-length [5], cap sleeve [4], elbow-length [3], long-length [2], short length [1] and three-quarter length [6] and the like. The length is selected from the above-knee length [7], knee-length [8], mini-length [9] and the like. The user attributes are selected from one or more of size and height. The size comprises standard size and custom size.

The comparison module [109] searches through the product pattern and order pattern repositories [103a,103b] for the exact or closest match to the user inputs captured from the customization input module [107]. The comparison module [109] determines the pattern that has the same or similar features by matching components with the style and size specifications in the database and by matching the features associated with the components with the features of clothes in the design database [103]. The computing module [101] determines a feature distance between the query image features and the features of the clothes in the database [103]. The comparison module [109] then retrieves the most similar items based on level of changes required to customize the apparel for a particular user based on size and style preferences. Smaller the change required for a resulted pattern, it is labeled as the closest match.

The Product Pattern Repository [103a] with the graded patterns of all launched products is therefore created and maintained. The custom-styling options, such as sleeve types [1-6], neckline types [10-15] and length types [7-9], for each individual product, as identified by the design team, are fed to the consumer at purchase and also to the pattern making process. The method of altering the nearest standard size to the exact height and size of the customer and the method for altering the standard styling specifications to the customer's choice of styling specifications allows the process that is invented to deliver height, size and styling customized to the customer. For example, the pattern files at the product pattern repository [103a] comprise a pattern ID, Product ID and default style and body type.

The customized pattern making process has the built-in unique flexibility to deliver to the customer the following:
Standard Size, Standard Style, Standard Height
Standard Size, Standard Style, Specific Height
Custom Size, Standard Style, Specific Height
Standard Size, Custom Style, Specific Height
Custom Size, Custom Style, Specific Height An Order Pattern Repository [103b] with the patterns created for all processed orders is also maintained. When a customer orders a product, the height, size and style requirements of the customer are also received from the customer. The size could be a standard size per a size chart or a custom size requirement with measurements specified by the customer through the easy user device [106] provided to her. The styling requirement could be the standard styling as designed in the product or a custom styling based on the styling options for neckline, sleeve and length. The Order Pattern Repository [103b] is searched by a computing module [101] for a pattern with the exact match of sizing and styling requirement. If an exact match is found, the same pattern can be reused for processing this order. If not, the closest match is retrieved and the procedure is followed to modify the pattern per the size and style requirement of the customer. The modified pattern is used for processing the order and is added to the Order Pattern Repository [103b], tagged with the size and style of the pattern for future reuse. The process also involves storing all customer preference and feedback information which is automatically retrieved when pattern is made for a fresh order. This enables the pattern making to be faster and better with each purchase.

The recommendation module [108] which suggests to the customer at ordering the custom styling options suitable to her is included in the process. Any alteration in the customer's size can be easily input by the customer and the pattern made to match it.

Figure 2:
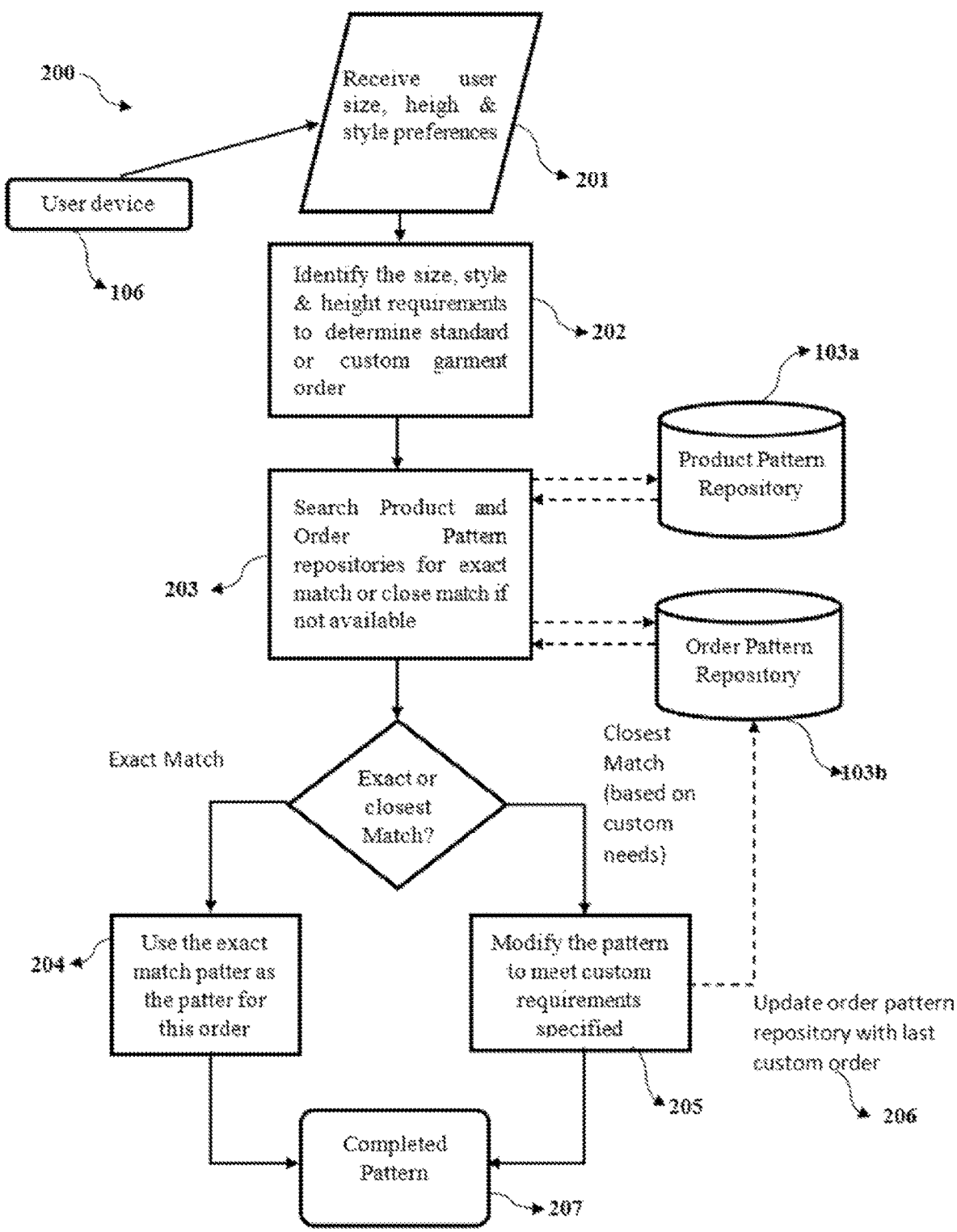
FIG. 2: illustrates the flowchart illustrating the computer assisted method of pattern-making for mass customized production of apparels.

FIG. 2 illustrates the flowchart of the computer assisted method [200] of pattern-making for mass customized production of apparels. The user attributes and style preferences are received [201] at the user device [106] and computed from the customization input module [107] of the client side [102a]. The user style and attributes requirements are identified [202] to determine standard or customized apparel order. The product pattern and order pattern repositories [103a,103b] are searched [203] for exact match or closest match by the comparison module [109]. The same pattern is reused [204] for processing the order if an exact match is found. The pattern is modified [205] to meet custom requirements specified, if closest match is found else order pattern repository is updated [206] with last custom order input. The pattern is manually tailored [207] for custom apparel.

After the measurements and style customization is finalized for a particular order, the tailor manually designs the apparel. The tailor fully designs the apparel if the custom size and style does not match with any other previous order. The tailor partially designs the apparel if the size and style has closest match. The tailor picks the already designed apparel if the size and style has the exact match.

The product pattern repository [103a] is configured to store graded patterns of all launched garments for all standard sizes and default styles for custom styling options. The order pattern repository [103b] is configured to store previously processed ordered patterns per the customer's size and style specifications and constantly updated to latest order. The computing module [101] computes a closeness quotient for sizing and styling for each available pattern. The customization input module [108] is configured to incorporate one or more user preferences of style and attributes. The product pattern and order pattern repositories [103a,103b] are searched by the comparison module [109] for finding an exact match or the closest match with user requirements.

The pattern defines all the pieces required to stitch the apparel per a defined size and style. The exact shape, size and connection points of each piece are also defined by the pattern. The accuracy of the pattern is key to getting the right fit. When the size needs to be adjusted per the customer's body measurements, the size and shape of each piece will need to be modified to provide a comfortable fit per the measurements. When a style feature needs to be modified, such as a short sleeve needs to be made a long sleeve, the pattern needs to be modified to change the shape and length of the pieces corresponding to the sleeve.

The pattern is tailored for various types of sleeves with grading to multiple sizes. These patterns can be used as a building block to create the desired pattern. When a sleeve type from database needs to be updated in a base pattern, the incomplete pattern for the required sleeve and size may be integrated into the base pattern by adjusting the connection points appropriately.

The information stored in the Product Pattern Repository [103a] is explained. The patterns maintained in this repository [103a] are tagged with the default styling they correspond to. Since the patterns are graded to all standard sizes, the patterns are also tagged with the standard sizes corresponding to a size chart.

The information stored in the Order Pattern Repository [103b] is explained. The patterns maintained in this repository [103b] are tagged with the sizing and styling they correspond to, per the specifications mentioned in the order for which this pattern was created.

The Product Pattern and Order Pattern Repositories [103a,103b] are searched to find an exact match or the closest match. If an exact match is found, the same pattern can be reused for processing this order. If not, the closest match is retrieved and the procedure is followed to modify the pattern per the size and style requirement of the customer. The modified pattern is used for processing the order and is added to the Order Pattern Repository [103b], tagged with the size and style specifications of the pattern for future reuse.

The key size parameters to search on to find the closest match are defined for each apparel type. For example, the key size parameters for a dress may be defined as bust, hip and waist measurements. Similarly, the closeness factor between various types of a styling feature, are defined by the level of change required to modify from one type to another. Based on these factors, the comparison module [109] searches through the repositories [103] for patterns available for the same product by comparing with the sizing and styling specifications tagged in the repository [103]. The comparison module [109] computes a closeness quotient for sizing and a closeness quotient for styling for each available pattern. Based on these quotients, the closest matches are provided to a pattern maker to choose a pattern to start with and manually follow the procedure to modify the pattern per the specified sizing and styling requirements.

Figure 3A:
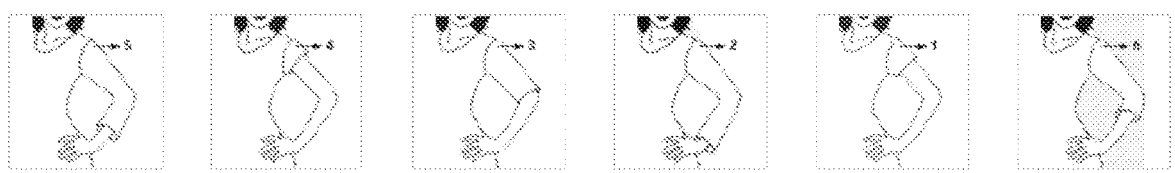
FIG. 3a, 3b, 3c: illustrates an exemplary embodiment of the computer assisted system of pattern-making for mass customized production of apparels.
Figure 3B:
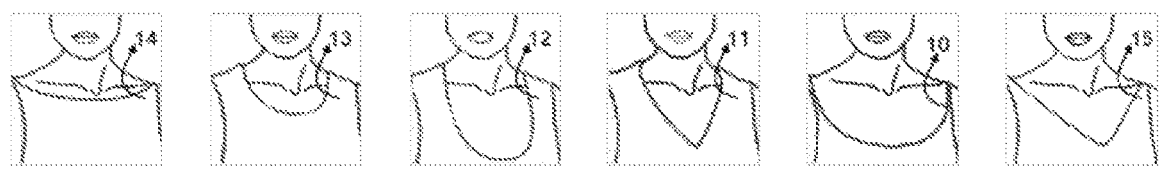
Figure 3C:
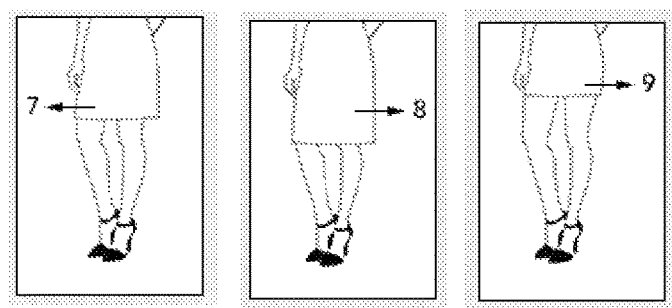

FIG. 3a,3b,3c: illustrates an exemplary embodiment of the computer assisted system of pattern-making for mass customized production of apparels. The neckline is selected from the boat [14], scoop [13], U-neck [12], V-neck [11], wide-scoop [10], wide V [15] and the like. The sleeves are selected from the bracelet-length [5], cap sleeve [4], elbow-length [3], long-length [2], short length [1] and three-quarter length [6] and the like. The length is selected from the above-knee length [7], knee-length [8], mini-length [9] and the like. The user attributes are selected from one or more of size and height. The size comprises standard size and custom size.

The user device [106] is provided with clothes images. The imaged used for searching is selected and transmitted to the computer assisted system [100] of pattern-making for mass customized production of apparels. The resulting search results are provided on the user device allowing the user to view the clothing or apparel and select clothes or apparel of interest.

The user device [106] sends user queries to the server [104] and downloads and displays retrieved items from the server [104]. The favorite part/design of the query clothes can be interactively selected by the user and send to the server [104] via the processor [105].

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

We claim:

1. A computer assisted system [100] of pattern-making for mass customized production of apparels, comprising:
    a computing module [101] to compute plurality of operations as per a user's request;
    a network [102] for communicating information between a client side [102 a] and a user device [106];
    a design database [103] comprising a product pattern repository [103 a] and an order pattern repository [103 b];
    one or more servers [104];
    at least one processor [105];
    a customization input module [107];
    a user style recommendation module [108]; and
    a comparison module [109], wherein the computing module [101] is configured to receive user data input at a web portal or an application programming interface (API), wherein the product pattern repository [103 a] is configured to store graded patterns of standard sizes and default style and body type for all launched garments, wherein the order pattern repository [103 b] is configured to store previously processed ordered patterns for different sizes and style specification of order, wherein the customization input module [107] is configured to incorporate one or more user preferences of style and attributes, and wherein the product pattern repository [103 a] and the order pattern repository [103 b] are searched by the comparison module [109] for finding an exact match or a closest match to attributes and style preferences of the user, and then makes incremental changes with user requirements to create or manufacture a custom apparel.

2. The computer assisted system [100] of pattern-making for mass customized production of apparels as claimed in claim 1, wherein the user device [106] is selected from one or more of personal computer, personal digital assistant (PDA), smart phone, laptops, desktops or tablets.

3. The computer assisted system [100] of pattern-making for mass customized production of apparels as claimed in claim 1, wherein the one or more of user preferences of style and attributes are selected from one or more of size and height.

4. The computer assisted system [100] of pattern-making for mass customized production of apparels as claimed in claim 3, wherein the size comprises standard size and custom size.

5. The computer assisted system [100] of pattern-making for mass customized production of apparels as claimed in claim 1, wherein the customization input module [107] provides options of neckline [10-15], sleeves [1-6] or length [7-9] and the like of the apparel to the user.

6. The computer assisted system [100] of pattern-making for mass customized production of apparels as claimed in claim 1, wherein the design database [103] stores all customer preference and feedback information which is automatically retrieved when pattern is made for a fresh order.

7. The computer assisted system [100] of pattern-making for mass customized production of apparels as claimed in claim 1, wherein the user style recommendation module [108] suggests the user at ordering suitable custom styling options.

8. The computer assisted system [100] of pattern-making for mass customized production of apparels as claimed in claim 1, wherein the comparison module searches through the product pattern and order pattern repositories [103 a,103 b] for the exact or closest match to the user inputs captured from the customization input module [107].

9. A computer assisted method [200] of pattern-making for mass customized production of apparels, comprising:

receiving [201] user attributes and style preferences at a user device [106] and inputting into customization input module [107] at a client side [102 a];

identifying [202] user style and attributes requirements to determine a standard apparel order or a customized apparel order;

searching [203] a product pattern repository [103 a] and an order pattern repository [103 b] for an exact match or a closest match to the user attributes and style preferences by a comparison module [109];

reusing [204] the exact match for processing an order if the exact match is found;

modifying [205] a custom pattern to meet custom requirements specified, if the closest match is found, and updating [206] the order pattern repository with the user style and attributes requirements and tailoring [207] a customized pattern for the customized apparel order, wherein the product pattern repository [103 a] is configured to store graded patterns of all launched garments for all standard sizes and default style and body type, wherein the order pattern repository [103 b] is configured to store previously processed ordered patterns and is constantly updated to information from each order, wherein a computing module [101] computes a closeness quotient for sizing and styling for each available pattern, and wherein the customization input module [107] is configured to incorporate one or more user preferences of style and attributes.

* * * * *